United States Patent
Bhimani et al.

(10) Patent No.: US 10,956,294 B2
(45) Date of Patent: Mar. 23, 2021

(54) METHODS AND SYSTEMS FOR TESTING STORAGE DEVICES VIA A REPRESENTATIVE I/O GENERATOR

(71) Applicant: Samsung Electronics Co., Ltd., Suwon-si (KR)

(72) Inventors: Janki Sharadkumar Bhimani, Billerica, MA (US); Rajinikanth Pandurangan, Fremont, CA (US); Vijay Balakrishnan, Mountain View, CA (US); Changho Choi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 517 days.

(21) Appl. No.: 15/853,419

(22) Filed: Dec. 22, 2017

(65) Prior Publication Data
US 2019/0087300 A1   Mar. 21, 2019

Related U.S. Application Data

(60) Provisional application No. 62/559,447, filed on Sep. 15, 2017.

(51) Int. Cl.
*G06F 11/34* (2006.01)
*G06F 3/06* (2006.01)
*G06F 11/30* (2006.01)

(52) U.S. Cl.
CPC .......... *G06F 11/3414* (2013.01); *G06F 3/061* (2013.01); *G06F 3/0679* (2013.01); *G06F 11/3428* (2013.01); *G06F 11/3485* (2013.01); *G06F 3/0605* (2013.01); *G06F 11/3034* (2013.01)

(58) Field of Classification Search
CPC ............ G06F 11/3414; G06F 11/3428; G06F 11/3485; G06F 11/3034; G06F 3/061; G06F 3/0679; G06F 3/0605
See application file for complete search history.

(56) References Cited

U.S. PATENT DOCUMENTS

| | | | |
|---|---|---|---|
| 7,996,824 | B2 | 8/2011 | Bell, Jr. |
| 9,268,702 | B2 | 2/2016 | Bilas et al. |
| 9,329,968 | B2 | 5/2016 | Pechanec et al. |
| 9,417,891 | B2 | 8/2016 | Beveridge |
| 2016/0134493 | A1 | 5/2016 | Susarla et al. |
| 2016/0140025 | A1 | 5/2016 | Enright et al. |

(Continued)

OTHER PUBLICATIONS

Chen, P. & Patterson, D. "Storage Performance—Metrics and Benchmarks" Proceedings of IEEE, vol. 81, No. 8 (1993) (Year: 1993).*

(Continued)

*Primary Examiner* — Jay Hann
(74) *Attorney, Agent, or Firm* — Lewis Roca Rothgerber Christie LLP

(57) ABSTRACT

A system and method of generating representative I/O. The system is configured to utilize representative I/O patterns stored in a pattern database. A user may select one or more patterns to perform I/O using. The patterns are modified according to user supplied parameters and multiple parameters are integrated into a single workload. I/O is then generated according to the workload and system performance may be measured.

20 Claims, 6 Drawing Sheets

(56) References Cited

U.S. PATENT DOCUMENTS

| | | |
|---|---|---|
| 2016/0285966 A1 | 9/2016 | Breech et al. |
| 2017/0085460 A1 | 3/2017 | Hart et al. |
| 2017/0153963 A1 | 6/2017 | Chahal et al. |
| 2017/0206015 A1 | 7/2017 | Zhuang et al. |
| 2018/0217913 A1* | 8/2018 | Chahal ............... G06F 11/3457 |

OTHER PUBLICATIONS

Krietemeyer, M., et al. "Environment for I/O Performance Measurement of Distributed and Local Secondary Storage" Proceedings of 2005 Int'l Conf. on Parallel Processing Workshops, ICPPW'05 (2005) (Year: 2005).*

Pasnoori, R., et al. "Survey on Application Level Tools for SSD Benchmark Validation" UKSim 15th Int'l Conf. on Computer Modelling & Simulation, pp. 341-346 (2013) (Year: 2013).*

Lee, D., et al. "A Framework for Measuring the Performance and Power Consumption of Storage Components under Typical Workload" (2011) (Year: 2011).*

Li, W. & Tremblay, B. "Storage Benchmarking for Workload Aware Storage Platform" IEEE 9th Int'l Conf. on Cloud Computing, pp. 835-838 (2016) (Year: 2016).*

Han, Rui et al., *BigDataBench—MT: A Benchmark Tool for Generating Realistic Mixed Data Center Workloads*, 2016, pp. 10-21, Springer International Publishing Switzerland.

Allaire, JJ, Dygraphs vo.4.5, *Interface to Dygraphs Interactive Time Series Charting Library*, https://www.rdocumentation.org/packages/dygraphs/versions/0/4/5, 3 sheets.

Vanderkam, Dan, et al., *dygraphs* Reference Manual, https://cran.r-project.org/web/packages/dygraphs/dygraphs.pdf, https://CRAN.R-project.org/package=dygraphs, 34 sheets.

Haghdoost, Alireza et al., *On the Accuracy and Scalability of Intensive I/O Workload Replay*, Usenix The Advanced Computing Systems Association, https://www.usenix.org/conference/fast17/technical-sessions/presentation/haghdoost, 2017, 15 sheets.

Gracia-Tinedo, Raul, et al., *SDGen: Mimicking Datasets for Content Generation in Storage Benchmarks*, Usenix The Advanced Computing Systems Association, https://www.usenix.org/conference/fast15/technical-sessions/presesntation/gracia-tinedo, 2015, 15 sheets.

Schönberger, Georg, *TKperf*, https://www.thomas-krenn.com/en/wiki/TKperf, 5 sheets.

Hailey, Kyle, *Fio_scripts* readme, https://github.com/khailey/fio_scripts/blob/master/README.md, 7 sheets.

Gates, Lee, et al., *Block Volume Performance Analysis*, IaaS Blog—Oracle Cloud Infrastructure News, https://blogs.oracle.com/cloud-infrastructure/block-volume-performance-analysis, 2017, 9 sheets.

CloudHarmony Inc., *Block Storage Benchmark* readme, https://github.com/cloudharmony/block-storage, 11 sheets.

storagereview.com, *Fio-Flexible I/O Tester Synthetic Benchmark—StorageReview.com*, https://www.storagereview.com/fio-flexible-i-o-tester-synthetic-benchmark, 6 sheets.

Philhower III, Earle F., ezFIO—Powerful, Simple NVMe SSD Benchmark Tool—NVM Express, https://nymexpress.org/ezfio-powerful-simple-nvme-ssd-benchmark-tool/, 5 sheets.

González, Javier, *Automating fio tests with Python*, Posted on Apr. 28, 2015, https://javigon.com/2015/04/28/automating-fio-tests-with-python/, 4 sheets.

González, Javier, https://github.com/javigon/fio_tests, 3 sheets.

Bacchella, Fabrice, *fiorun*, https://github.com/fbacchella/fiorun, 6 sheets.

* cited by examiner

METHODS AND SYSTEMS FOR TESTING STORAGE DEVICES VIA A REPRESENTATIVE I/O GENERATOR

CROSS-REFERENCE TO RELATED APPLICATION(S)

The present application claims priority to, and the benefit of, U.S. Provisional Patent Application No. 62/559,447, filed on Sep. 15, 2017, the contents of which are incorporated herein by reference in its entirety.

BACKGROUND

1. Field

Some embodiments of the present disclosure relate generally to generating I/O for storage system benchmarking.

2. Description of the Related Art

Improving the performance of solid-state-drives (SSDs) has become very important as SSDs have proliferated throughout the storage industry. Likewise, the importance of properly benchmarking SSD-based storage systems has become increasingly important since storage system benchmarking is used to test the effect of any SSD firmware or hardware modifications.

Many storage system benchmarks either use samples of proprietary data or synthesize simple artificial data for simulating application Input/Output (I/O). Typical synthesized I/O data includes random I/O or sequential I/O. Either way, most I/O generators for benchmarking storage typically generate unrealistically uniform data based on the average characteristics of real applications and do not focus on the variance of I/O properties over disk space and/or runtime. Advancements in flash SSDs such as multi-streaming, key-value store, 3D Xpoint, etc. may also behave differently using uniform synthetic data versus real-world application data. Thus, while current storage system benchmarks are relatively easy to use and deploy, their usefulness in predicting real-world behavior is limited.

Testing with real application workloads yields more representative benchmarking results, but the deployment of a real application and workload setup is a very time consuming process that involves installation, configuration, database loading, and then database operation for each application workload. Furthermore, storing traces from real applications requires a huge amount of storage space. Since there numerous different applications and each can run many different workloads. A system with the simplicity of a benchmark application and the reliability of a real application workload is therefore needed.

The above information is only for enhancement of understanding of the background of embodiments of the present disclosure, and therefore may contain information that does not form the prior art.

SUMMARY

Aspects of embodiments of the present invention relate to a system and method for testing storage devices via a representative I/O generator.

According to some embodiments, a storage system is configured for generating representative Input/Output (I/O). The storage system has a processor and a memory coupled to the processor, that stores instructions that, when executed by the processor, cause the processor to retrieve a first representative I/O pattern from a pattern database. The instructions then cause the processor to assemble a representative workload by modifying the first representative I/O pattern according to at least one workload parameter. Representative I/O may then be generated based on the representative workload. Storage system performance may then be measured.

According to some embodiments, the instructions further cause the processor to retrieve a second representative I/O pattern from the pattern database and assembling a representative workload further includes modifying the second representative I/O pattern according to the at least one workload parameter and integrating the first modified I/O pattern with the second modified I/O pattern.

According to some embodiments, the instructions further cause the processor to identify a conflict between the first modified representative I/O pattern and the second modified representative I/O pattern, resolve the conflict by further modifying at least one of the first modified representative workload or the second modified representative workload, and generate representative I/O based on modified workloads.

According to some embodiments, the instructions further cause the processor to generate a graphical user interface (GUI) for receiving a selection of the first representative I/O pattern and the at least one workload parameter.

According to some embodiments, the at least one workload parameter includes at least one of a runtime, a storage size, and/or a background noise level.

According to some embodiments, the storage system performance comprises a SSD performance.

According to some embodiments, the first representative I/O pattern is a repetitive I/O pattern measured on the storage system while executing an application.

According to some embodiments, the first representative I/O pattern comprises at least one workload.

According to some embodiments, the storage system performance includes at least one of a throughput, a bandwidth, an Input/Output Operations Per Second (IOPS), or a latency.

BRIEF DESCRIPTION OF THE DRAWINGS

Some embodiments can be understood in more detail from the following description taken in conjunction with the accompanying drawings, in which.

DETAILED DESCRIPTION

Figure 1:
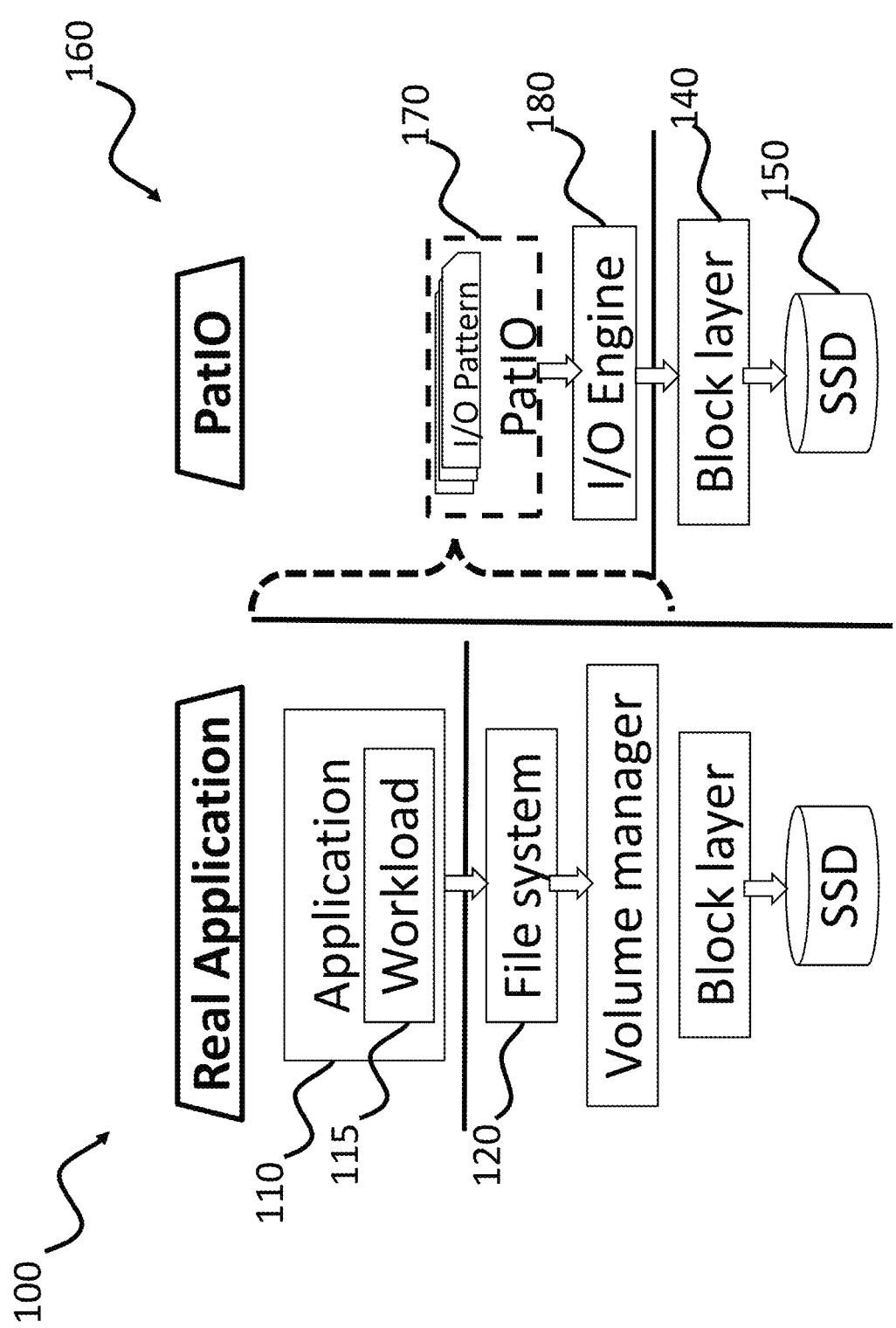
FIG. 1 is a block diagram illustrating I/O stacks according to embodiments of the present invention.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein regarding sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

According to various embodiments, a system and method for testing storage systems utilizes a representative I/O system is configured to generate Input/Output (I/O) operations that are representative of real applications performing I/O. The representative I/O system utilizes identified I/O patterns that occur under various application workloads in different configurations such as with different application workload setup, file systems, memory, underlying SSD model, and/or the like. Multiple stored I/O patterns may be combined to replicate various real workloads that may be used to benchmark SSDs.

FIG. 1 is a block diagram illustrating I/O stacks according to embodiments of the present invention.

Referring to FIG. 1, a general I/O stack 100 and a pattern I/O stack 160 are depicted. The general I/O stack 100 depicts the I/O stack when a normal application 110 is operating on a storage server. For example, a processor executes instructions from a memory to execute an application 110 (e.g. a database such as MySQL, Postgre, Mongodb, Cassandra etc.). The application 110 runs various workloads 115 (e.g. queries, insertions, retrievals etc.) that generate I/O. The generated I/O requests are passed along the I/O stack to the filesystem 120, the volume manager 130, and then to the block devices 140. The block devices 140 may include one or more SSDs 150.

According to various embodiments, the representative I/O system utilizes the pattern I/O stack 160 to simulate I/O operations similar to real applications as seen by the SSDs 150. For example, a processor executes instructions from a memory to execute representative I/O using the pattern I/O generator 170. The pattern I/O generator 170 creates various I/O requests based on previously observed I/O patterns from actual application workloads. The pattern I/O generator 170 passes the I/O requests to an I/O engine 180 which in turn issues the I/O requests to the block devices 140/SSDs 150.

Although depicted as singular I/O stacks, a storage system may include multiple cores, each having the ability to process multiple threads. In some examples, a storage system may have multiple applications running multiple workloads operating at the same time. Similarly, in some embodiments, the pattern I/O generator 170 and I/O generator 180 are configured to issue I/O requests from multiple I/O patterns as will be further discussed below.

In various embodiments, the representative pattern I/O generator may also be configured to also include variations of the patterns that are introduced by other aspects of the I/O stack 100. For example, the file system 120 and the volume manager may introduce some latency to the I/O requests from the application 110.

Figure 2:
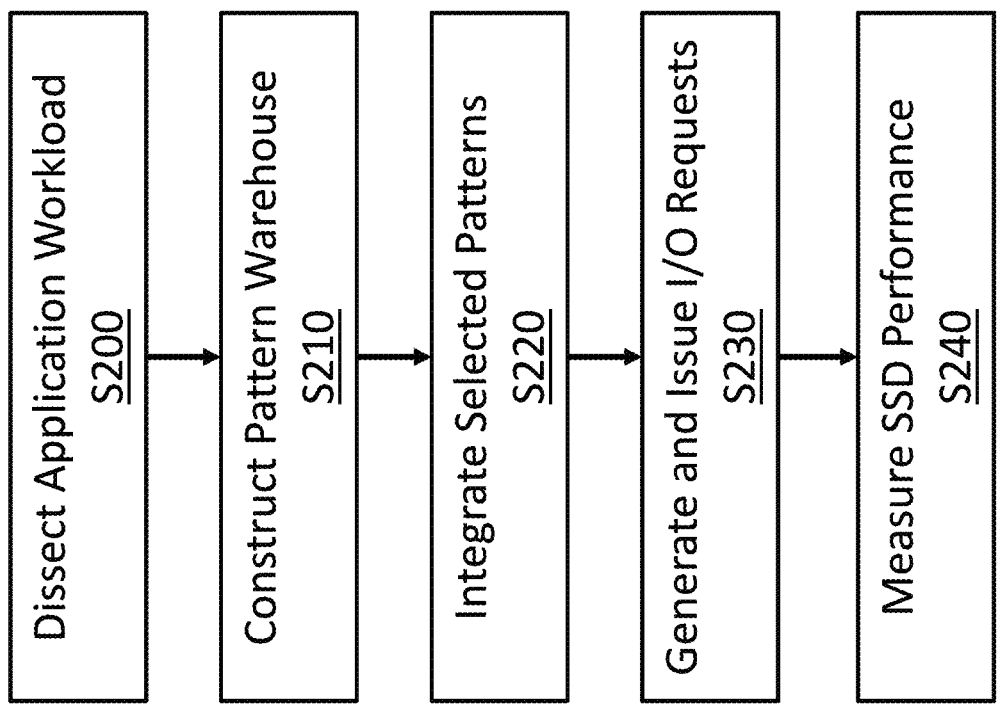
FIG. 2 is a block diagram illustrating a method of generating representative I/Os according to an embodiment of the present invention.

FIG. 2 is a block diagram illustrating a method of generating representative I/Os according to an embodiment of the present invention.

Referring to FIG. 2, in various embodiments, the generation of representative I/O starts with dissecting normal application workload I/O into distinct repetitive I/O patterns (S200). For example, pattern repetition frequency, read/write temperature density, I/O size variations etc. may be captured from the normal application workload. The system then constructs a pattern warehouse (S210) that includes each of the identified patterns along with the various job parameters of an I/O engine operating when the pattern was captured. The representative I/O generator can then access patterns stored in the pattern warehouse and convolves (e.g. integrates) the patterns to reproduce the characteristics of storage system workload (S220). The representative I/O generator then generates the requests and the I/O engine issues the requests (S230). The resulting I/O performance may then be measured (S240). In various embodiments, the I/O performance may be measured and the performance may be measured in terms of throughput, bandwidth, Input/Output Operations Per Second (IOPS), latency etc. (e.g. in the same manner as when a real application is operating).

Figure 3:
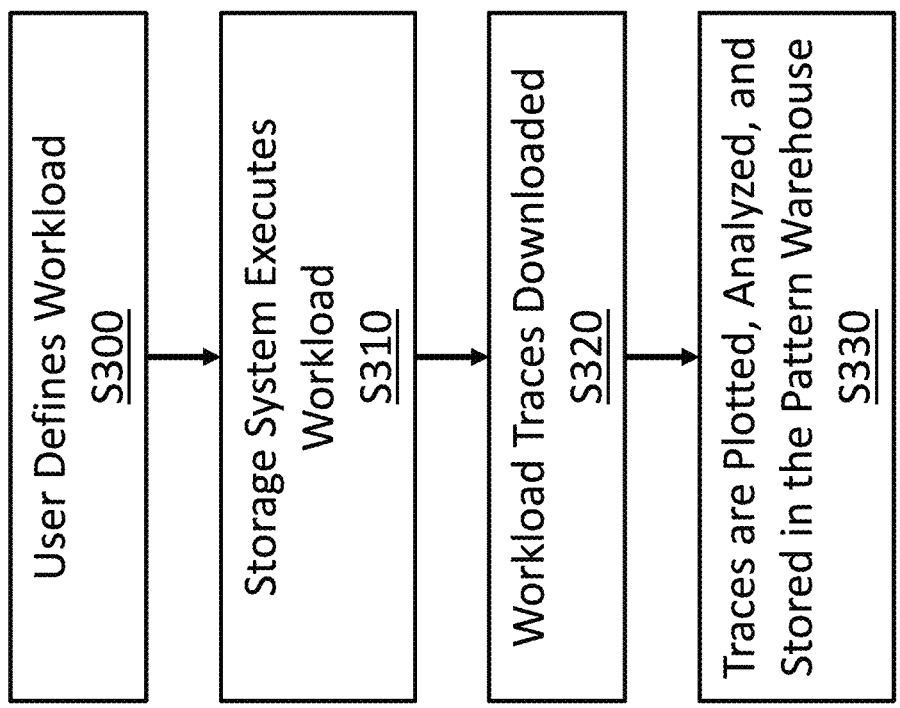
FIG. 3 is a block diagram illustrating a method of dissecting I/O to identify I/O patterns according to various embodiments of the present invention.

FIG. 3 is a block diagram illustrating a method of dissecting I/O to identify I/O patterns according to various embodiments of the present invention.

Referring now to FIG. 3, in various embodiments, a storage system may execute a storage system workload. The workload may include one or more applications (e.g. the normal application 110) operating on one or more threads of a processor of the storage system. Each application may include one or more application workloads (e.g. jobs) operating concurrently or successively. Different real workloads may be studied under different operation conditions such as with different applications, file systems, disk models etc. Depending upon the cumulative observation derived from all the above variations of a workload and an application, an I/O workload that is representative of a group can be captured and later replicated. The different possible features that can be given as an input to I/O engine may therefore be studied. Examples of these features include—rate_iops, —numjobs, —runtime, —size, —thinktime_blocks, —offsets etc. Finally, the combination of these features that would generate the desired representative I/O pattern is developed and stored as I/O pattern.

In various embodiments, a user may utilize a GUI to define the desired I/O statistics for the representative storage system workload (S300). For example, the user may select which applications 110 to run, as well as further designate workload parameters such as the I/O zones, I/O depth, I/O size, I/O distribution, ramp time, block size, delays, IOPS, etc. Thus, the user may select various parameters to capture different I/O distributions for different workloads. The desired workload is then executed for a desired period of time (S310). After the workloads have been completed, traces of the workloads may be downloaded from the storage system (S320). These traces may then be plotted and I/O patterns identified and stored in the pattern warehouse (S330).

In various embodiments, an I/O pattern may be identified by recognizing repetitive patterns across time intervals or across disk offset gaps produced by the applications. The repetitive patterns often include "I/O holes" and may be identified according to blank spaces in the I/O plots. These I/O holes may be caused by system stalls (e.g. while waiting for system resources such as the CPU, I/O bus, traffic on channels etc.) or when upper layers in the I/O stack such as the cache or memory are able to fulfil the I/O request. Different shapes and sizes of I/O holes may be captured by setting options (e.g. using the GUI) that define the number of blocks to be written before taking a break or a leap in terms of disk offset. The identification of the patterns may be done manually by a user or automatically by a program. In various embodiments, the captured I/O patterns may include background noise caused by additional operations on the server. For example, the background noise may be introduced into the I/O patterns by housekeeping activities (e.g. saving and restoring a program state for called functions, obtaining local memory on the stack, initializing local variables at the start of a program or function, backup and/or removal of un-needed files and software, execution of disk maintenance utilities (e.g. ScanDisk, hard drive defragmenters, virus scanners etc.)) being performed on the sever.

Figure 4:
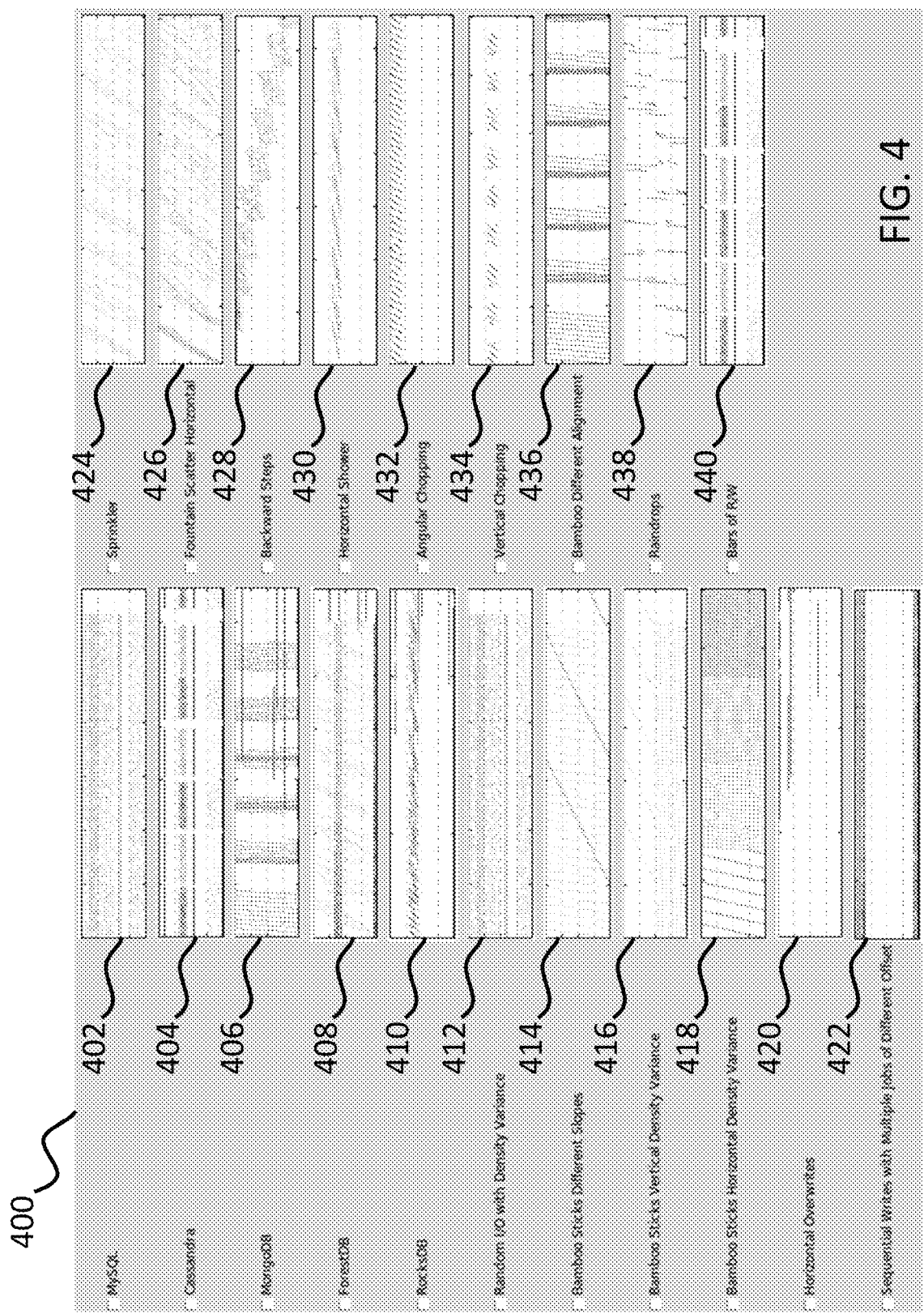
FIG. 4 includes graphs of various example I/O patterns according to various embodiment s of the present invention.

FIG. 4 includes a GUI illustrating graphs of various example I/O patterns.

Referring to FIG. 4, a GUI 400 includes some example identified patterns include patterns generated using applications and patterns generated by a synthetic I/O. For example, the patterns may include a MySQL pattern 402, a Cassandra pattern 404, a MongoDB pattern 406, a ForestDB pattern 408, a RocksDB pattern 410, a Random I/O with Density Variance pattern 412, a Bamboo Sticks Different Slopes pattern 414, a Bamboo Sticks Different Vertical Density Variance pattern 416, a Bamboo Sticks Different Horizontal Density Variance pattern 418, a Horizontal Overwrites pattern 420, a Sequential Writes with Multiple jobs of Different Offset pattern 422, a Sprinkler pattern 424, a Fountain Scatter Horizontal pattern 426, a Backward Steps pattern 428, a Horizontal Shower pattern 430, an Angular Chopping pattern 432, a Vertical Chopping pattern 434, a Bamboo Different Alignment pattern 436, a Raindrops pattern 438, and a Bars of Read/Write pattern 440.

Figure 5:
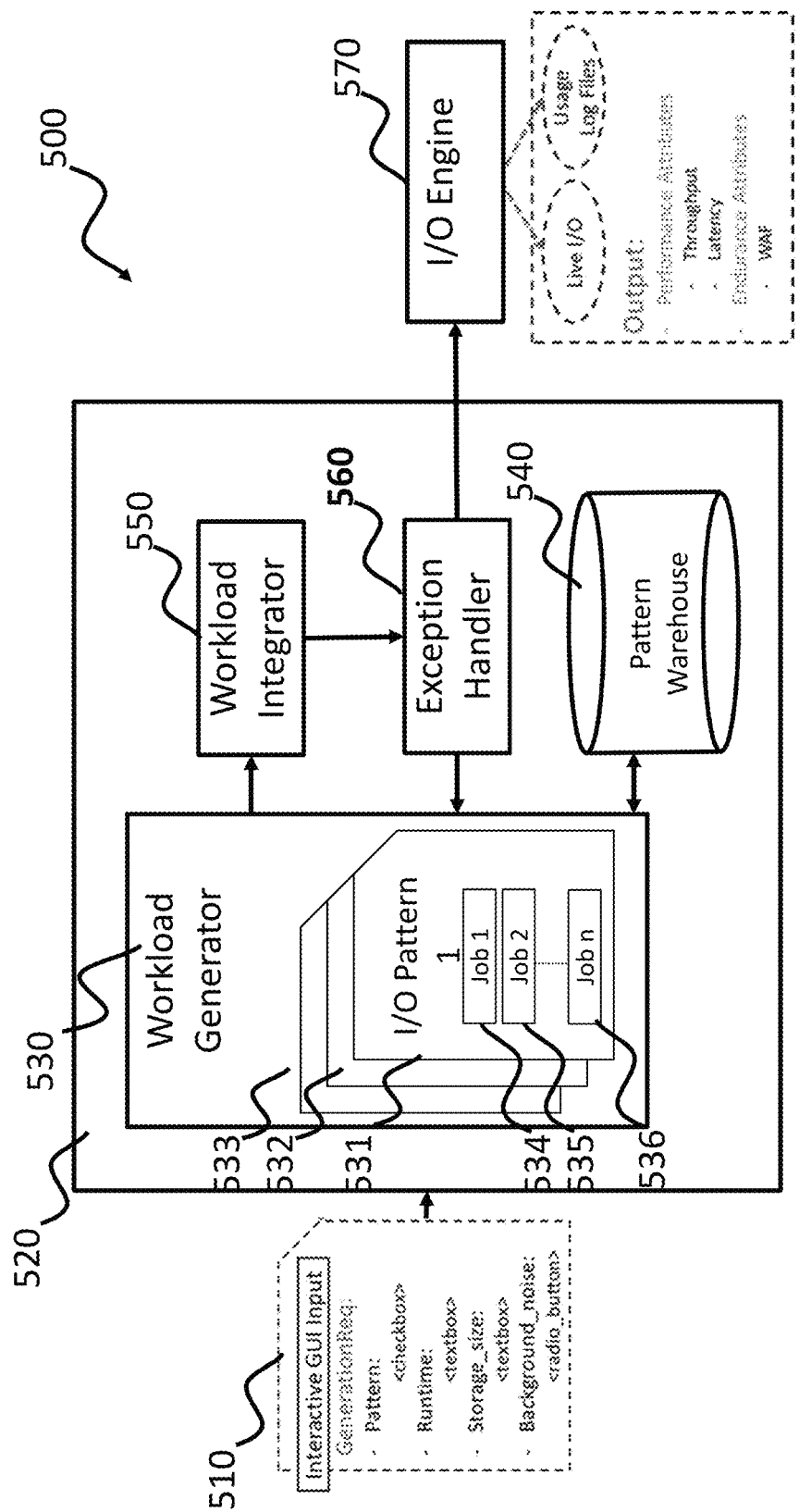
FIG. 5 is a functional block diagram for a system for generating representative I/O according to an embodiment of the present invention.
Figure 6:
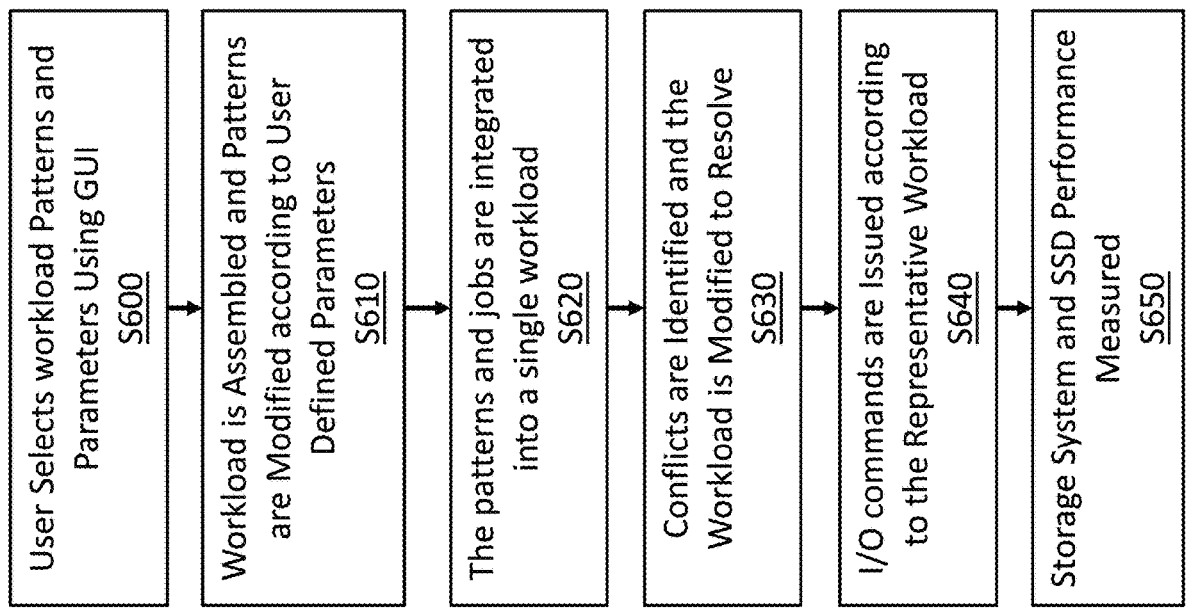
FIG. 6 is a block diagram illustrating a method of generating representative pattern I/O and performing SSD benchmarking according to various embodiments of the present invention.

FIG. 5 is a functional block diagram for a system for generating representative I/O according to an embodiment of the present invention. FIG. 6 is a block diagram illustrating a method of generating representative pattern I/O and performing SSD benchmarking according to various embodiments of the present invention.

Referring to FIGS. 5 and 6, according to various embodiments, the system for generating representative I/O 500 may operate on a storage server. In various embodiments, a GUI 510 provides an interactive input that allows for a user to designate a representative workload that they would like to use for SSD benchmarking. The GUI 510 allows the user to select various combinations of representative workload patterns and to define how big a workload is in terms of time and size (S600). For example, in addition to selecting representative workload patterns, a user may further define the representative workload by selecting workload parameters such as runtime, storage size, and whether to include background noise. The background noise may include a noise percentage that is relative to the disturbance of housekeeping and background activities.

Once a user has selected the options for their representative workload using the GUI 510, the representative I/O pattern generator 520 is configured to integrate the various user selected patterns and modify the patterns as needed. In various embodiments, the representative I/O pattern generator 520 includes a workload generator 530 configured to retrieve the selected patterns from a pattern warehouse 540. The pattern warehouse 540 includes at least one representative I/O pattern that was captured while running an application workload as described above. In various embodiments, the representative I/O workload may include multiple patterns 531, 532, 533 and each of patterns may include one or more associated workloads (e.g. jobs) 534, 535, 536. A user can select any combinations of existing patterns in terms of layout of the I/Os on disk space with respect to time. For example, the first workload 534 may include a first runtime, a first storage size, and a first background noise level. The second workload 535 may include the same first runtime, a second storage size, and the same first background noise level. Thus, the I/O produced for each pattern to may be varied to provide different workloads.

In various embodiments, the workload generator 530 modifies the selected representative patterns according to the user selected parameters (S610). In some examples, each of the patterns from the pattern warehouse 540 may have specific runtime and storage size parameters and, depending on the selected workload parameters, the patterns stored in the pattern warehouse 540 may need to be modified for operation. For example, when the storage size is modified the workload generator 530 identifies the effected features from the pattern and scales them according to the designated storage size. For example, for each of the I/O patterns, the features may be set relatively such as if the desired size of disk for which representative workload is generated is increased, then the I/O activities also spans through the whole desired size of disk. Similarly, the workload generator 530 may also extend patterns to fit the designated runtime.

According to various embodiments, after a workload has been modified, a workload integrator 550 is configured to integrate each of the patterns (S620). For example, the workload integrator may convolve and/or concatenate the patterns 531-533 and associated workloads 534-536 of a representative workload. In some embodiments, the representative workload may be a single multi-threaded workload. For example, a user may have defined a representative I/O workload having a first pattern and a second pattern being operated concurrently. A storage system may at least one processor having multiple multithreaded cores. The workload integrator 550 formats the patterns such that the I/O performed due to the first pattern is driven by processor to operate on at least one thread of the multiple multi-threaded cores and the I/O performed due to the second pattern is also driven by the processor to operate on at least one thread of the multiple multithreaded cores. In some embodiments, each thread performing representative I/O may have an I/O stream that connects to a multi-stream SSDs.

In some instances, the selected I/O representative patterns 531-533 and associated jobs may cause some sort of I/O conflict. For example, one job may contradict the commands or data of another job (e.g. a first job may overwrite some portion of the data written by another job on the SSD) causing a data conflict, or one workload may interfere with another workload by issuing a command (e.g. a "<killall>" or other command that interferes with another I/O) that interferes with the operation of another pattern. In various embodiments, an exception handler 560 is configured to identify any I/O conflicts, identify what type of conflict is present (e.g. contradicting conflicts or interference conflicts), and modify the patterns to resolve the conflict (S630). For example, when a contradicting conflict between two workloads is identified, the exception handler 560 may modify the workload according to a priority provided by the user. In another example, the exception handler 560 may remove a conflicting pattern and replace it with a substitute pattern. In yet another example, the exception handler 560 may modify a workload parameter so that the conflict is resolved.

In another example, the exception handler 560 identifies an interference conflict. In this example, the exception handler 560 may remove the interfering I/O or may reschedule the workloads so that the conflict no longer occurs. For example, the representative I/O generator platform may be multi-threaded and each pattern may consists of multiple jobs that each instantiates multiple threads. Some of the features of I/O engine are applicable to all the running threads of I/O engine (such as feature—killall) that can affect threads of multiple jobs. If a single job is only running individually then there is no problem, but to generate the I/O pattern we run multiple concurrent jobs. Each I/O pattern is launched as a single process. And all the features of I/O engine that effects all the running threads of I/O engine are redirected to effect only the concerned process. Once the conflict has been resolved, the workload generator 530 modifies the workload to accommodate the change. In some embodiments, the workload generator 530 may select an alternative pattern from the pattern database 540. The workload integrator 550 convolves the modified workload and the workload is re-evaluated for conflicts by the exception handler 560. When a representative workload is free of conflicts, the representative I/O generator 520 passes the workload to the I/O engine 570 which issues the I/Os to the SSDs (S640). The storage system and SSD performance may then be benchmarked (S650). The measurements may be displayed live as the representative I/O is being executed and the measurements may also be logged for later review. The measurements include both performance attributes (e.g. throughput, latency, IOPS, etc.) and endurance attributes (e.g. write amplification factor etc.).

Accordingly, the above described embodiments of the present disclosure provide for systems and methods for testing storage devices using a representative I/O generator. Unlike previous systems for performing storage device benchmarking, the system is able to simulate real-world application I/O instead of the overly simplistic I/O of current benchmarking tools. Representative I/O allows for performing benchmarking that has the ease-of-use of using a traditional benchmarking tool while still providing the performance of an actual application workload. Additionally, the storage requirements are minimal when compared to using application traces.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A storage system configured for generating representative Input/Output (I/O), the storage system comprising:
a processor; and
a memory coupled to the processor, wherein the memory stores instructions that, when executed by the processor, cause the processor to:
retrieve, from a pattern database, a first representative I/O pattern;
retrieve, from the pattern database, a second representative I/O pattern;
assemble a representative workload by modifying the first representative I/O pattern and the second representative I/O pattern according to at least one workload parameter and according to a conflict between the first representative I/O pattern and the second representative I/O pattern;
generate representative I/O based on the representative workload; and
measure a storage system performance.

2. The system of claim 1, and wherein assemble a representative workload further comprises:
integrating the first representative I/O pattern with the second representative I/O pattern.

3. The system of claim 2, wherein the representative workload comprises a first modified representative workload and a second modified representative workload, and
wherein the instructions further cause the processor to:
identify the conflict between the first representative I/O pattern and the second representative I/O pattern;
resolve the conflict by further modifying at least one of the first modified representative workload or the second modified representative workload; and
generate representative I/O based on the further modified first modified representative workload and second modified representative workload.

4. The system of claim 1, wherein the instructions further cause the processor to:
generate a graphical user interface (GUI) for receiving a selection of the first representative I/O pattern and the at least one workload parameter.

5. The system of claim 4, wherein the at least one workload parameter comprises at least one of a runtime, a storage size, and a background noise level.

6. The system of claim 1, wherein storage system performance comprises a solid-state drive (SSD) performance.

7. The system of claim 1, wherein the first representative I/O pattern comprises an I/O pattern identified on the storage system while executing an application.

8. The system of claim 1, wherein the first representative I/O pattern comprises at least one workload.

9. A method of performing storage system benchmarking comprising:
retrieving, by a processor from a pattern database stored in memory, a first representative Input/Output (I/O), pattern;
retrieving, by the processor from the pattern database stored in memory, a second representative I/O pattern;
assembling, by the processor, a representative workload by modifying the first representative I/O pattern and the second representative I/O pattern according to at least one workload parameter and according to a conflict between the first representative I/O pattern and the second representative I/O pattern;
generating, by the processor, representative I/O to at least one solid-state drive (SSD) based on the representative workload; and
measuring, by the processor, a storage system performance.

10. The method of claim 9, further comprising:
and wherein assembling, by the processor, a representative workload further comprises:
integrating the first representative I/O pattern with the second representative I/O pattern.

11. The method of claim 10, wherein the representative workload comprises a first modified representative workload and a second modified representative workload, and
wherein the method further comprises:
identifying, by the processor, the conflict between the first representative I/O pattern and the second representative I/O pattern;
resolving the conflict by further modifying at least one of the first modified representative workload or the second modified representative workload; and
generating the representative I/O based on the further modified first modified representative workload and second modified representative workload.

12. The method of claim 9, further comprising:
receiving from a graphical user interface (GUI) the first representative I/O pattern and the at least one workload parameter.

13. The method of claim 9, wherein the at least one workload parameter comprises at least one of a runtime, a storage size, and a background noise level.

14. The method of claim 9, wherein the first representative I/O pattern comprises an I/O pattern identified on the storage system while executing an application.

15. The method of claim 9, wherein the storage system performance comprises at least one of a throughput, a bandwidth, an Input/Output Operations Per Second (IOPS), or a latency.

16. A storage system configured for generating representative Input/Output (I/O), the storage system comprising:
a processor; and
a memory coupled to the processor, wherein the memory stores instructions that, when executed by the processor, cause the processor to:
receive, at a graphical user interface, a user selection for a first representative I/O pattern, a second representative I/O pattern, and at least one workload parameter;
retrieve, from a pattern database, the first representative I/O pattern and the second representative I/O pattern;
modify the first representative I/O pattern and the second representative I/O pattern according to the at least one workload parameter and a conflict between the first representative I/O pattern and the second representative I/O pattern;
integrate the first representative I/O pattern with the second representative I/O pattern to produce a single representative workload;
generate representative I/O based on the single representative workload; and
measure a storage system performance.

17. The storage system of claim 16, wherein the processor is a multithreaded processor and the single representative workload is multithreaded.

18. The system of claim 16, wherein the instructions further cause the processor to:
identify the conflict between the first representative I/O pattern and the second representative I/O pattern;
resolve the conflict by further modifying at least one of the first representative I/O pattern or the second representative I/O pattern; and
generate representative I/O based on the further modified first modified representative workload and second modified representative workload.

19. The system of claim 16, wherein the storage system performance comprises a solid-state drive (SSD) performance.

20. The system of claim 16, wherein the first representative I/O pattern comprises an I/O pattern identified on the storage system while executing an application and an associated workload.

* * * * *

UNITED STATES PATENT AND TRADEMARK OFFICE
CERTIFICATE OF CORRECTION

| | |
|---|---|
| PATENT NO. | : 10,956,294 B2 |
| APPLICATION NO. | : 15/853419 |
| DATED | : March 23, 2021 |
| INVENTOR(S) | : Janki Sharadkumar Bhimani et al. |

It is certified that error appears in the above-identified patent and that said Letters Patent is hereby corrected as shown below:

In the Claims

Column 10, Line 48, Claim 9     delete "(I/O)," and insert -- (I/O) --

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*